United States Patent Office 3,563,827
Patented Feb. 16, 1971

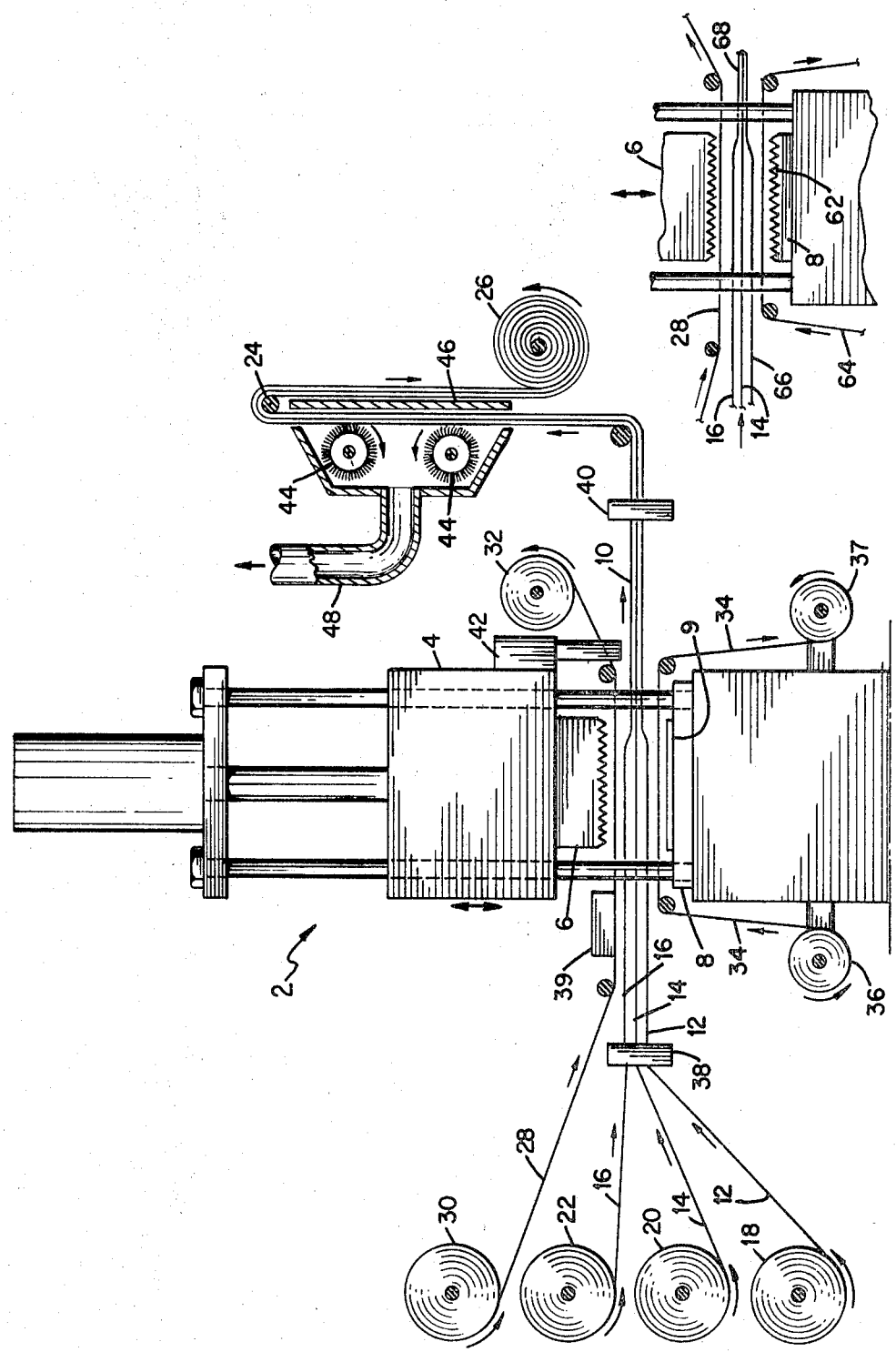

3,563,827
METHOD OF MANUFACTURING A DECORATIVE VINYL SURFACE
Charles W. Zylinski, North Arlington, N.J., assignor to Harte & Company, Inc., New York, N.Y., a corporation of New York
Continuation-in-part of application Ser. No. 429,452, Feb. 1, 1965. This application June 8, 1966, Ser. No. 556,124
Int. Cl. B32b 3/06
U.S. Cl. 156—209                                     6 Claims

ABSTRACT OF THE DISCLOSURE

Products are produced from vinyl sheets and the like having an embossed surface and having decorative coloring deposited in the depressions. Such products are produced by simultaneously forming the depressed surface areas and depositing the decorative coloring on such areas by passing the product to be embossed and a carrier film coated with a suitable decorative ink through a heat sealing die. The heat and pressure form depressed surface areas and simultaneously transfer the ink from the carrier film to the area where heat sealing has been performed.

---

This application is a continuation-in-part of my co-pending application Ser. No. 429,452, filed Feb. 1, 1965, now abandoned.

This invention relates to embossing and otherwise forming products of sheet material and the like, and more in particular to providing decorative vinyl sheets alone and in combination with other sheets and to similar products. As used herein, the term "vinyl" shall mean polyvinyl chloride, polyvinyl chloride-acetate copolymers and/or homologues thereof.

An object of this invention is to provide improved methods and means for embossing vinyl sheets and the like. A further object is to produce decorative sheet structures by arrangements which permit wide leeway in the mode of operation and the resulting products. A further object is to provide for the production of improved quilted-pattern products utilizing vinyl sheets and the like. A further object is to produce porducts with decorative coloring, utilizing electronic heat-sealing or "welding" or "stitching." A further object is to provide improved methods and apparatus for producing decorative coloring in the depressed surfaces of products made from vinyl sheets and the like. A further object is to provide for the above by methods and equipment which insure high quality products, and which are efficient, dependable, and relatively simple in construction and operation. These and other objects will be in part obvious and in part pointed out below.

In producing various products from vinyl sheets and the like it is often desirable to perform an embossing operation and to deposit decorative coloring in the depressions. However, vinyl sheets are relatively unstable, i.e., they tend to stretch and change their relative dimensions. Therefore, while the embossing may be completely satisfactory so that the product is of high quality, the attempts to deposit decorative coloring upon the product have been unsatisfactory because of failure to achieve proper registration between the embossing and the coloring. Similarly when such sheet materials are used to produce laminated products by electronic heat sealing, great difficulty has been encoutered in the attempts to provide associated decorative coloring of a quality to meet even the minimum commercial requirements. It is an object of the present invention to overcome the difficulties which have been encountered in the production of products of this type.

The transfer of the ink from the carrier sheet is insured by the natural tendency for the carrier sheet to reject the ink. It should be noted that the carrier sheet has not been treated with a corona discharge to render the ink receptive.

In accordance with the present invention the decorative coloring is produced simultaneously with the production of the depressed surface areas. For example, when it is desirable to electronically heat-seal a vinyl sheet to other sheets or webs to produce decorative coloring in the depressed surface areas, on the vinyl surface the procedure is as follows: A thin sheet of untreated carrier film is coated upon one surface with a decorative ink which will have a preferential affinity for the vinyl sheet. The carrier film is then passed through the heat sealing apparatus directly beneath the heat sealing die and with the ink-coated surface positioned upon the vinyl sheet. The electronic heat-sealing operation is then performed in the standard manner. Due to the perferential affinity of the ink for the vinyl sheet, the heat and pressure transfers the ink from the carrier film to the vinyl surface, and the ink is securely adhered to the vinyl sheet throughout each area where the heat sealing has been performed. Essentially the same or similar procedures are followed for depositing coloring in the depressed areas of other products of this type.

The transfer of the ink from the carrier film is insured by the natural tendency for this film to reject the ink. The carrier film may be characterized as a web of material which has no affinity for the vinyl or film to which the ink is being transferred. Materials which are suitable for use as the carrier film are polyethylene, polypropylene, polystyrene and fluorocarbons, such as tetrafluoroethylene with polyethylene presently being preferred. Other suitable materials include polyacetals, polyacrylin, polycarbonates, polyesters, e.g., polyethylene terephthalate and chlorinated polyethers, e.g., bis(chloromethyl)oxetane. A material such as coated paper also may be used as a carrier film to transfer the ink.

In accordance with further aspects of this invention, the decorative coloring can be produced simultaneously upon both sides of the product. Also, the product may be performed somewhat so that the decorative coloring is applied within portions of the products which have been previously produced.

In the drawings:

FIG. 1 is a somewhat schematic representation of the machine and method for producing products in accordance with the present invention;

FIG. 2 is a fragmentary view similar to a portion of FIG. 1 and representing another embodiment of the invention;

Figure 3:
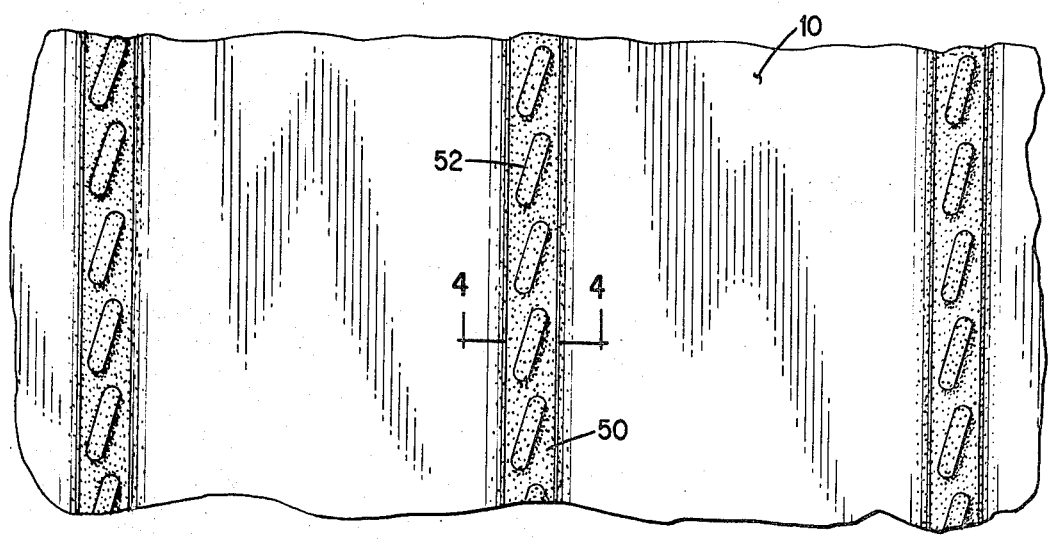
FIGS. 3 and 5 are greatly enlarged plan views of products produced in accordance with the invention; and, FIG. 4 is an enlarged sectional view on the line 4—4 of FIG. 3.

Referring to FIG. 1 of the drawings a hydraulic press 2 has a head 4 which carries an electronic heat-sealing die 6. During operation, head 4 is moved vertically to and from a position wherein die 6 embosses sheet material positioned upon a buffer plate 8, over which there is a buffer sheet 9 of "fish paper." In this embodiment, the following webs are passed through the press and laminated by the heat-sealing into a strip 10: a bottom skin or backing sheet 12; a sheet of wadding 14; and, a top sheet of vinyl film 16. These webs are drawn respectively from rolls 18, 20 and 22 mounted at the left, and the finished web 10 passes upwardly around a roller 24 and then downwardly and is wound onto a roll 26. There is also a web of carrier film or sheet 28 which is drawn from a roll 30 and extends directly beneath die 6 and is wound into a roll 32. The carrier film is coated on its bottom surface with an ink which has a preferential affinity for the vinyl sheet, and which is rejected by the carrier film. A web of release paper 34 passes from a roll 36 beneath sheet 12 and is wound onto a roll 37.

When the heated die is moved downwardly toward the buffer plate 8, the sheets 28, 12, 14, and 16 are compressed in the pattern of the die upon the release paper 34 against the buffer sheet 9 and the buffer plate 8. The heat and pressure act together to heat-seal the sheets 16, 14, and 12 together throughout the areas of maximum compression of the die pattern. Simultaneously, the heat and pressure cause the ink upon the bottom surface of web 28 to be transferred from the carrier film to the vinyl sheet throughout all of the heat-sealed areas which are the depressed surface areas of the finished product. The die then moves upwardly and the webs are indexed another step through the press and the process is repeated.

During movement of the die, the three webs 12, 14 and 16 are clamped together at the left of the press by an indexing clamp 38, and the laminated web 10 is clamped at the right by an indexing clamp 40. There is also an indexing unit 42 for the carrier film 28. These indexing clamps and unit 42 are interconnected and controlled by means (not shown) and act at the end of each heat-sealing operation to advance all of the webs a distance equal to the width of die 6. Hence, after the die has moved downwardly and then upwardly, the indexing clamps 38 and 40 move together to advance webs 12, 14, and 16 sufficiently to move the left-hand edge of the heat-sealing portion of the webs to the right hand edge of die 6, and unit 42 moves the "used" portion of web 28 the same distance. The web of release paper 34 is also indexed forwardly as desired. The pattern on die 6 produces one or more complete pattern designs during each heat-sealing operation, and the indexing movement by clamps 38 and 40 is sufficiently accurate to insure a commercially satisfactory continuous design upon the finished product.

Frequency discharge box 39 prevents arcing of webs 12, 14 and 16 and carrier film 28 as they pass under die 6. This unit does not constitute a part of the present invention, but is a standard and necessary part of the apparatus.

When the laminated web 10 passes upwardly it is engaged by a pair of rotary brushes 44 which act against a backing plate 46 to loosen and remove any scales or particles of the ink which are losely clinging to the vinyl surfaces at the sides of the areas of the heat-sealing. An air suction connection 48 draws the ink particles away.

Figure 4:
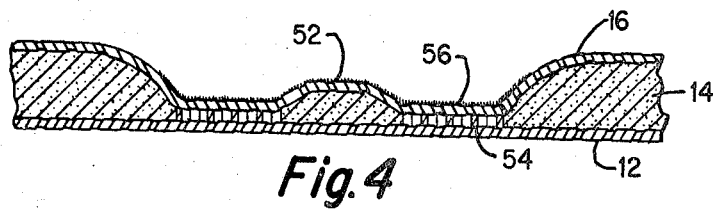
Figure 5:
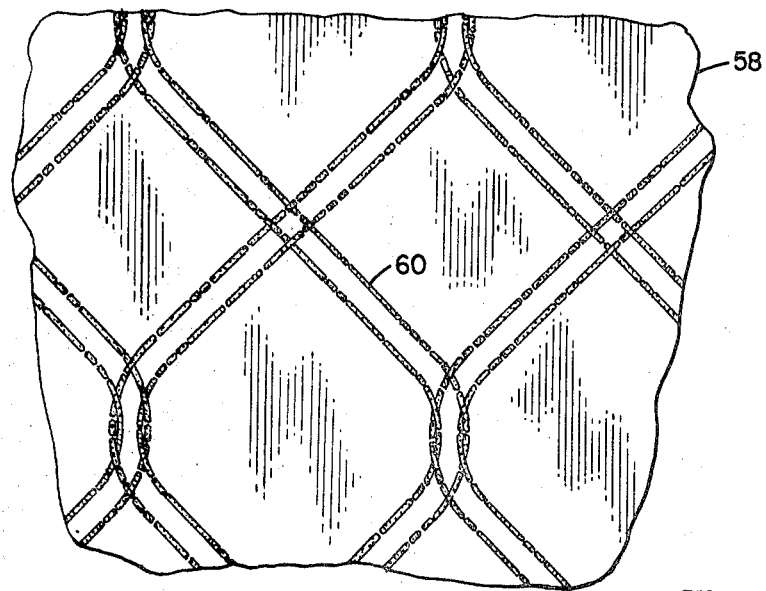

As indicated above, FIGS. 3 and 4 are greatly enlarged showings of the completed product represented by web 10 in FIG. 1. The heat-sealing die has a configuration to produce strips 50 of heat-sealing with oblong bulges 52 which simulate stitching. As shown in FIG. 4, sheets 12 and 16 and wadding 14 are heat-sealed into a laminated portion at 54, and the entire depressed surface areas are coated with the decorative coloring or ink 56. In the embodiment of FIG. 5, the sheet 58 has a decorative design formed by lines 60, which simulates a very fine stitching.

In the embodiments of FIGS. 3, 4, and 5, which are produced by the apparatus of FIG. 1, the decorative coloring is produced only upon the top surface of the web 10. However, under some circumstances it is desirable to produce decorative coloring upon both sides of the finished sheet. For that purpose press 2 of FIG. 1 is provided, as shown in FIG. 2, with a bottom die 62, which takes the place of the buffer sheet 9 and rests upon buffer plate 8. The web of release paper 34 is replaced by a web of carrier film 64, which is identical with film 28, but which has its ink coated surface upwardly so as to be in contact with a vinyl sheet 66 forming a bottom web. This bottom sheet 66 replaces the backing sheet 12 of FIG. 1. When the press is set up as in FIG. 2, it is operated as described above in connection with FIG. 1, the web 68 provided with a decorative coating in the depressed surfaces of both the top and bottom of the web. Both sides of web 68 are subjected to a brushing and vacuum cleaning operation.

The ink which is used for coating a surface of the carrier film in the above examples is a standard formulation for inks used for decorating vinyl sheets. For example, it may contain 10 to 20% of bronze powder or other pigment, 60 to 70% of a clear vinyl lacquer, and 10 to 20% of a solvent.

It has been indicated above that the invention contemplates the decorative embossing of vinyl sheets and other products. The untreated thin carrier film is admirably suited for carrying the ink and depositing it onto the vinyl in a dependable manner; the ink transfers to the vinyl surfaces and the film will withstand the heat and pressure without adhering to the vinyl or to the die.

What is claimed is:

1. In the process of manufacturing a product having a decorative vinyl surface, the steps of:
    (a) coating one surface of a sheet of untreated carrier film with a coloring;
    (b) positioning said carrier film along the effective surfaces of a die of an electronic heat sealing apparatus which is adapted to produce a compressed pattern into a vinyl surface, said carrier film being positioned with the coated surface of the sheet opposite said die;
    (c) positioning the materials to form the product, including at least one vinyl sheet and a backing sheet, into operative relationship with said die, whereby the coated surface of said carrier film is co-extensive with the vinyl surface which is to be subjected to the compressed pattern; and
    (d) impressing said die through said carrier film against said vinyl surface at a pressure and temperature sufficient to form said vinyl surface and simultaneously transferring and adhering such coloring to said vinyl surface.

2. The process according to claim 1 wherein step (c) comprises positioning a vinyl sheet and a backing sheet, and a wadding positioned therebetween, into operative relationship with said die, whereby the coated surface of said carrier film is co-extensive with said vinyl surface which is to be subjected to the compressed pattern, said vinyl sheet, said backing sheet, said wadding, and said carrier film being positioned in a substantially parallel planar relationship; and wherein step (d) includes heat sealing said vinyl sheet to said backing sheet.

3. The process according to claim 2 wherein said sheets are continuous webs; wherein step (a) comprises coating one surface of an untreated polyethylene carrier film with a coloring and including additional steps
    (e) indexing said sheets at the end of said heat sealing operation to sequentially present adjacent sheet portions to said die; and
    (f) sequentially repeating steps (a), (b), (c), (d), and (e) along said continuous webs.

4. The process according to claim 3 including the additional step of
    (g) brushing said vinyl surface as it is withdrawn from operative position with respect to said die whereby any scales or particles of coloring loosely clinging to the vinyl surface will be removed.

5. In the process of manufacturing a laminated sheet product having a vinyl sheet surface with a quilted pattern, the steps of:
   (a) placing sheet material, comprising at least a vinyl sheet and a backing sheet, into an electronic heat sealing press having a die which will produce the desired pattern, said vinyl sheet, said backing sheet, and said die being in substantially parallel planar relationship;
   (b) positioning a sheet of untreated carrier film between said die and said vinyl sheet, said carrier film having a coating of coloring material which has a preferential affinity for said vinyl surface; and
   (c) heat sealing said vinyl sheet to said backing sheet to produce the desired pattern, and simultaneously transferring and adhering said coloring material to said vinyl surface.

6. The process according to claim 5 wherein said carrier film is a polyethylene film, and including the additional step, prior to step (b), of:
   (d) coating said polyethylene film on one side with a coloring material.

References Cited
UNITED STATES PATENTS

| | | | |
|---|---|---|---|
| 2,318,702 | 5/1943 | Millar | 156—219 |
| 2,621,138 | 12/1952 | Messing | 156—274 |
| 2,688,579 | 9/1954 | Meyer | 156—230 |
| 2,721,821 | 10/1955 | Hoover | 156—230 |
| 2,948,648 | 8/1960 | Douchet | 161—119 |
| 2,991,216 | 7/1961 | Hsu et al. | 156—380 |

MORRIS SUSSMAN, Primary Examiner

U.S. Cl. X.R.

161—119; 156—230, 272